United States Patent
Tolstoy et al.

(10) Patent No.: US 10,338,814 B1
(45) Date of Patent: Jul. 2, 2019

(54) MECHANISM FOR VIRTUAL TAPE LIBRARIES NON-DISRUPTIVE CONFIGURATION

(71) Applicant: EMC IP Holding Company LLC, Hopkinton, MA (US)

(72) Inventors: Mikhail Tolstoy, Saint Petersburg (RU); Karyn Kelley, Peabody, MA (US); Larry McCloskey, Billerica, MA (US); Igor Matveevskiy, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 15/639,222

(22) Filed: Jun. 30, 2017

(51) Int. Cl.
*G06F 3/06* (2006.01)

(52) U.S. Cl.
CPC ............ *G06F 3/0604* (2013.01); *G06F 3/067* (2013.01); *G06F 3/0629* (2013.01); *G06F 3/0659* (2013.01); *G06F 3/0664* (2013.01); *G06F 3/0601* (2013.01)

(58) Field of Classification Search
None
See application file for complete search history.

(56) References Cited

U.S. PATENT DOCUMENTS

| | | | |
|---|---|---|---|
| 7,302,540 B1 * | 11/2007 | Holdman | G06F 11/1456 711/112 |
| 7,620,765 B1 * | 11/2009 | Ohr | G06F 11/1448 711/162 |
| 8,291,183 B2 | 10/2012 | McCloskey et al. | |
| 8,458,422 B1 * | 6/2013 | Holdman | G06F 3/0605 711/162 |
| 8,667,239 B1 | 3/2014 | McCloskey et al. | |
| 8,775,756 B1 | 7/2014 | McCloskey et al. | |
| 8,793,452 B1 | 7/2014 | McCloskey et al. | |
| 8,924,682 B1 | 12/2014 | McCloskey et al. | |
| 9,009,443 B2 | 4/2015 | Haustein et al. | |
| 9,207,877 B1 | 12/2015 | McCloskey | |
| 9,436,591 B1 | 9/2016 | McCloskey et al. | |
| 9,471,233 B1 | 10/2016 | Goodwin-Jette et al. | |
| 9,552,370 B1 | 1/2017 | McCloskey et al. | |
| 9,582,207 B1 | 2/2017 | DeBlase et al. | |
| 10,126,969 B1 | 11/2018 | Tolstoy et al. | |
| 2004/0034811 A1 * | 2/2004 | Trimmer | G06F 11/1458 714/13 |
| 2005/0033911 A1 | 2/2005 | Kitamura et al. | |
| 2006/0123208 A1 | 6/2006 | Johnson | |
| 2007/0103984 A1 | 5/2007 | Kavuri et al. | |
| 2008/0222344 A1 * | 9/2008 | Upadhyayula | G06F 3/0607 711/4 |
| 2008/0301363 A1 * | 12/2008 | Kitamura | G06F 3/0607 711/111 |
| 2010/0086135 A1 * | 4/2010 | Wideman | G06F 21/6209 380/277 |
| 2010/0185813 A1 | 7/2010 | Muroyama | |

(Continued)

*Primary Examiner* — Brian R Peugh

(74) *Attorney, Agent, or Firm* — Chamberlain, Hrdlicka, White, Williams & Aughtry

(57) ABSTRACT

A mechanism for non-disruptive virtual tape libraries configuration. Specifically, the introduction of various additional computer processes permit the configuration of a virtual tape library without requiring the shutdown and re-initialization of the host application on which the virtual tape library resides.

20 Claims, 8 Drawing Sheets

(56) References Cited

U.S. PATENT DOCUMENTS

2012/0198146 A1    8/2012   Hostetter et al.
2012/0284555 A1   11/2012   Akirav et al.
2015/0154085 A1    6/2015   Iwasaki et al.

* cited by examiner

US 10,338,814 B1

MECHANISM FOR VIRTUAL TAPE LIBRARIES NON-DISRUPTIVE CONFIGURATION

BACKGROUND

The configuration of virtual tape drives and virtual tape libraries for use by mainframe applications is presently a disruptive process requiring the restarting of at least the server on which the virtual tape drives and virtual tape libraries reside.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a mechanism for non-disruptive virtual tape libraries configuration. Specifically, one or more embodiments of the invention entail the introduction of various additional computer processes to permit the configuration of a virtual tape library without requiring the shutdown and re-initialization of the host application on which the virtual tape library resides.

Figure 1:
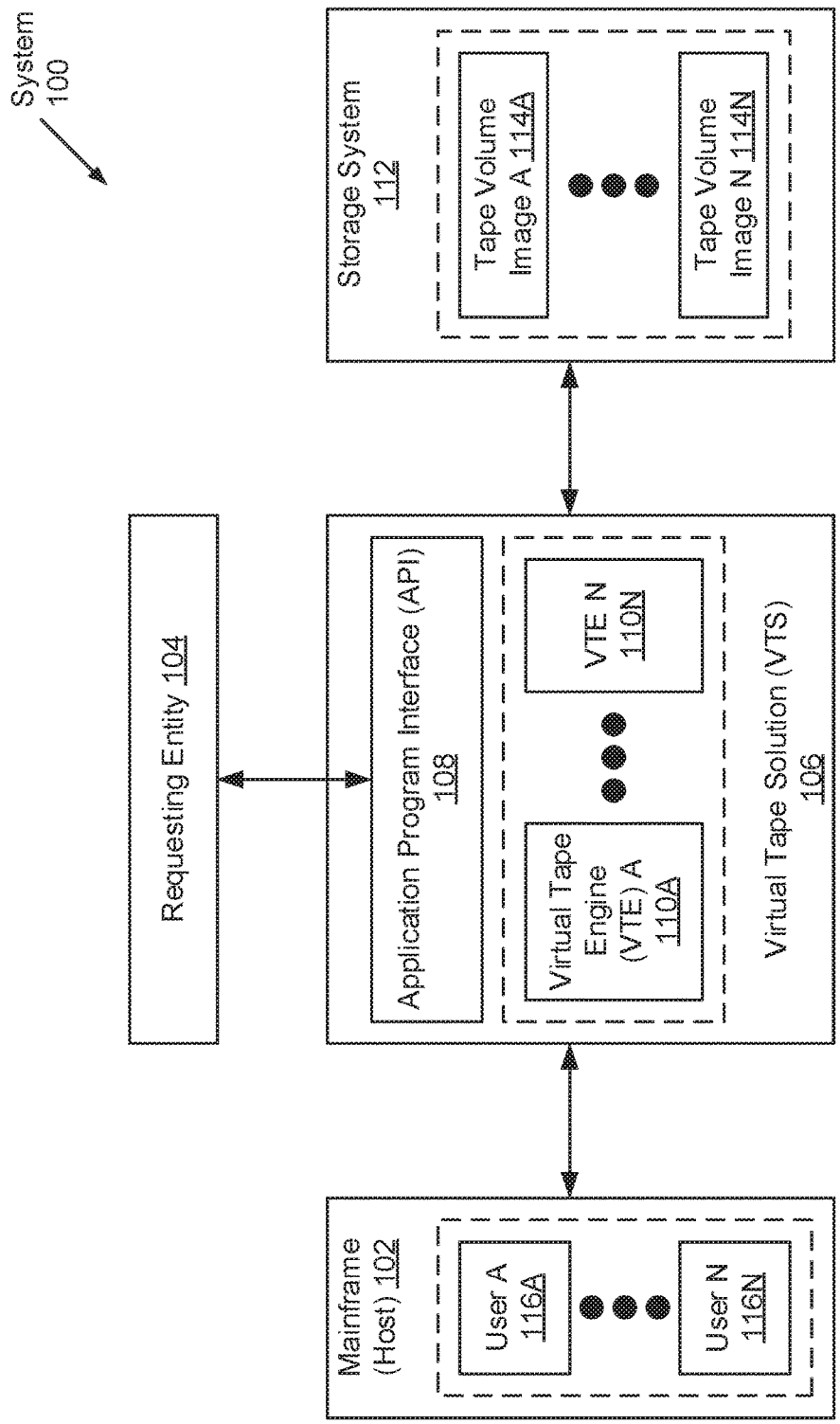
FIG. 1 shows a system in accordance with one or more embodiments of the invention.

FIG. 1 shows a system in accordance with one or more embodiments of the invention. The system (100) includes a virtual tape solution (VTS) (106) operatively connected to a mainframe (102), a requesting entity (104), and a storage system (112). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., switches, routers, servers, etc.) (not shown) that facilitate communication between the aforementioned components. Moreover, the aforementioned components may communicate with each other using any combination of wired and/or wireless communication protocols.

In one embodiment of the invention, the VTS (106) may be a disk-based data backup and archiving platform for the mainframe (102). The VTS (106) may include an application program interface (API) (108) and a set of one or more virtual tape engines (VTEs) (110A-110N). In one embodiment of the invention, the API (108) may provide a specification for the exchange of information between the VTS (106) and the requesting entity (104), or the VTS (106) and the mainframe (102). For example, the API (108) may establish that the exchange of information entails a request for processing and a return of a response based on the outcome of the processing (see e.g., FIGS. 4A-5D). In one embodiment of the invention, the API (108) may include logic dedicated towards the delegation of received requests to an appropriate VTE (110A-110N). To that end, the API (108) may include functionality to search and update locally-stored data structures (not shown), which may be used to store/map which VTE (110A-110N) is emulating which tape drive and/or defining which tape library (see e.g., FIG. 2). Further, the API (108) may be implemented using hardware, software, firmware, or any combination thereof. By way of one example, the API (108) may be a web API accessed through a webpage and a wide area network (WAN) (or Internet) connection.

In one embodiment of the invention, a VTE (110A-110N) may be a server on which one or more tape drives (described below) may be emulated and one or more tape libraries (described below) may be defined. Specifically, a VTE (110A-110N) may be a physical computing system programmed to: (i) receive and process requests concerning tape drives and/or tape libraries; (ii) add, remove, or re-configure one or more tape drives or tape libraries non-disruptively based on the requests; and (iii) generate and send responses to the requests based on the outcome of their processing. In one embodiment of the invention, the addition, removal, and/or reconfiguration of tape drives and/or tape libraries non-disruptively may refer to the performance of such actions without requiring the shutdown and restarting of the VTS (106). VTEs (110A-110N) are described in further detail below with respect to FIG. 2.

In one embodiment of the invention, the mainframe (102) may be any computing system (see e.g., FIG. 6) used for various applications. These applications may, for example, require large-scale and complex data processing. Further, the mainframe (102) may be any computing system that may serve multiple users (116A-116N) concurrently. The mainframe (102) may be programmed to provide and manage the allocation of computing resources for use by the various executing processes (e.g., tasks) instantiated by the one or more users (116A-116N). Further, the mainframe (102) may include functionality to submit input/output (I/O) requests to the VTS (106). The I/O requests may include, but are not limited to, requests to write data to a virtual tape drive (not shown) and requests to read data from the virtual tape drive.

In one embodiment of the invention, the requesting entity (104) may be any type of computing system (see e.g., FIG. 6) programmed to interact with the VTS (106). Specifically, the requesting entity (104) may include functionality to: (i) submit requests concerning one or more tape drives and/or tape libraries to the VTS (106); and (ii) receive responses, from the VTS (106), based on the outcome of the processing of the requests. By way of examples, the requesting entity (104) may be a desktop computer, a laptop computer, a smartphone, or a tablet computer operated by a network, datacenter, and/or mainframe administrator.

In one embodiment of the invention, the storage system (112) may be a back-end data repository implemented using any type of storage unit and/or device (e.g., a file system, database, collection of tables, or any other storage mechanism). The storage system (112) may be implemented using multiple storage units and/or devices, which may or may not be of the same type or located at the same physical site. In one embodiment of the invention, the storage system (112) includes functionality to store one or more tape volume images (114A-114N). A tape volume image (114A-114N) may represent, for example, a single file in a file system, or a single record in a database. Further, each tape volume image (114A-114N) may cache short-retention data and/or consolidate long-retention data used and/or generated by the various processes (e.g., tasks) which may be executing on the mainframe (102). In one embodiment of the invention, the storage system (112) may include functionality to manipulate the storage of the tape volume images (114A-114N) by way of providing, for example, the deduplication, compression, encryption, etc., of data. In one embodiment of the invention, the storage system (112) includes persistent storage (not shown). Examples of persistent storage hosted on the storage system (112) include, but are not limited to, optical storage, magnetic storage, NAND Flash memory, NOR Flash memory, Magnetic RAM memory (M-RAM), Spin Torque Magnetic RAM memory (ST-MRAM), Phase Change memory (PCM), and any other memory defined as a non-volatile Storage Class memory (SCM).

While FIG. 1 shows a configuration of components, other system configurations may be used without departing from the scope of the invention. For example, embodiments of the invention may be implemented using multiple instances of each component. Specifically, one set of components (including at least a mainframe, a VTS, and a storage system) may function as a primary system, whereas another set of components may function as a secondary or backup system activated once the primary system experiences failover.

Figure 2:
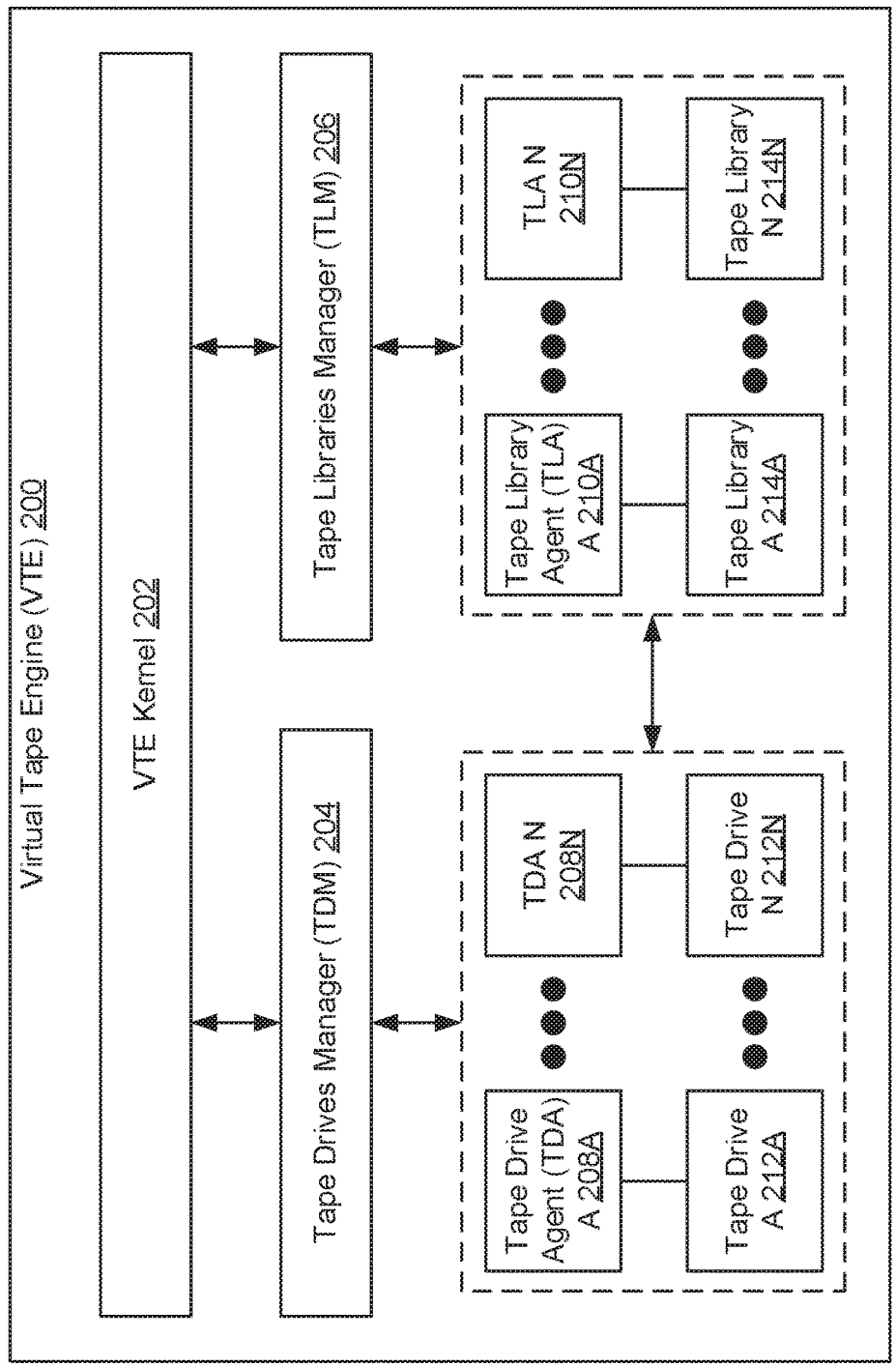
FIG. 2 shows a virtual tape engine in accordance with one or more embodiments of the invention.

FIG. 2 shows a virtual tape engine (VTE) in accordance with one or more embodiments of the invention. A VTE (200) includes a VTE kernel (202) operatively connected to a tape drives manager (TDM) (204) and a tape libraries manager (TLM) (206). The TDM (204) may be operatively connected to and responsible for one or more tape drive agents (TDAs) (208A-208N). Each TDA (208A-208N) may be operatively connected and responsible for one and only one emulated tape drive (212A-212N). Further, the TLM (206) may be operatively connected to and responsible for one or more tape library agents (TLAs) (210A-210N). Each TLA (210A-210N) may be operatively connected and responsible for one and only one tape library (214A-214N). Each of these components is described below.

In one embodiment of the invention, the VTE kernel (202) may be a core or central computer program executing on the VTE (200). The VTE kernel (202) includes functionality to: (i) receive and interpret requests relayed by the VTS API (see e.g., FIG. 1) from a requesting entity; (ii) delegate requests pertaining to the configuration of tape drives (212A-212N) to the TDM (204); (iii) delegate requests pertaining to the configuration of tape libraries (214A-214N) to the TLM (206); and (iv) receive and relay request reports (i.e., indicating the outcome of the received requests) from the TDM (204) or TLM (206) to the VTS API.

In one embodiment of the invention, the TDM (204) may be a computer process (or an instance of a computer program executing on the VTE (200)). Specifically, the TDM (204) may be a computer process dedicated towards the management of the one or more TDAs (208A-208N) which may be executing on the VTE (200). With respect to TDA management, the TDM (204) includes functionality to: (i) create and delete TDAs (208A-208N); (ii) create tape drives (212A-212N); (iii) assign TDAs (208A-208N) to tape drives (212A-212N); (iv) search and update the drive control table (DCT) (see e.g., FIG. 3A), which stores mappings identifying which TDA (208A-208N) may be managing which tape drive (212A-212N); (v) receive requests concerning the configuration (e.g., addition, removal, or modification) of one or more tape drives (212A-212N) which may be delegated from the VTE kernel (202); and (vi) generate and provide request reports, outlining the outcomes of the processed requests, to the VTE kernel (202).

In one embodiment of the invention, the TLM (206) may be a computer process (or an instance of a computer program executing on the VTE (200)). Specifically, the TLM (206) may be a computer process dedicated towards the management of the one or more TLAs (210A-210N) which may be executing on the VTE (200). With respect to TLA management, the TLM (206) includes functionality to: (i) create and delete TLAs (210A-210N); (ii) create tape libraries (214A-214N); (iii) assign TLAs (210A-210N) to tape libraries (214A-214N); (iv) search and update the library control table (LCT) (see e.g., FIG. 3B), which stores mappings identifying which TLA (210A-210N) may be managing which tape library (214A-214N); (v) receive requests concerning the configuration (e.g., addition, removal, or modification) of one or more tape libraries (214A-214N) which may be delegated from the VTE kernel (202); and (vi) generate and provide request reports, outlining the outcomes of the processed requests, to the VTE kernel (202).

In one embodiment of the invention, a TDA (208A-208N) may be a computer process (or an instance of a computer program executing on the VTE (200)). Specifically, a TDA (208A-208N) may be a computer process dedicated towards the management of one of the one or more tape drives (212A-212N) emulated on the VTE (200). With respect to tape drive management, a TDA (208A-208N) includes functionality to: (i) manage the life cycle of the managed tape drive (212A-212N); (ii) ready the managed tape drive (212A-212N) for deletion, when commanded, by (a) cleaning up the managed tape drive (212A-212N) and (b) setting a current usage state of the managed tape drive (212A-212N) to a dead state after the cleaning up; and (iii) update the management information (i.e., at least a portion of a tape drive configuration (TDC)) associated with the managed tape drive (212A-212N).

In one embodiment of the invention, a TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive. Further, in one embodiment of the invention, cleaning up a managed tape drive (212A-212N) may include, but is not limited to, the execution of the following processes: (i) the freeing up (or deallocation) of memory allocated to the managed tape drive (212A-212N); (ii) the refreshing of tape library references counter; and (iii) the dumping of statistics related to the managed tape drive (212A-212N).

In one embodiment of the invention, a TLA (210A-210N) may be a computer process (or an instance of a computer program executing on the VTE (200)). Specifically, a TLA (210A-210N) may be a computer process dedicated towards the management of one of the one or more tape libraries (214A-214N) defined on the VTE (200). With respect to tape library management, a TLA (210A-210N) includes functionality to: (i) manage the life cycle of the managed tape library (214A-214N); (ii) remove/delete the managed tape library (214A-214N) in response to a shutdown command; and (iii) update management information (i.e., at least a portion of library management information (LMI)) associated with the managed tape library (214A-214N).

In one embodiment of the invention, LMI may include, but is not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) describing how data organized by the tape library would be stored.

In one embodiment of the invention, a tape drive (212A-212N) may be an emulation of physical tape hardware. Accordingly, a tape drive (212A-212N) may be a software construct (e.g., a virtual machine) that implements physical tape drive functionality. Physical tape drive functionality may include, but is not limited to, the reading and writing of data used and/or generated by the mainframe to the storage system (see e.g., FIG. 1).

In one embodiment of the invention, a tape library (214A-214N) may be a single file system within which one or more tape volume images (see e.g., FIG. 1) may be mounted. As a file system, a tape library (214A-214N) may store identifiers and/or address locations in memory or non-transitory computer readable media (e.g., the storage system (see e.g., FIG. 1)) within which data (i.e., tape volume images) may be consolidated.

Figure 3A:
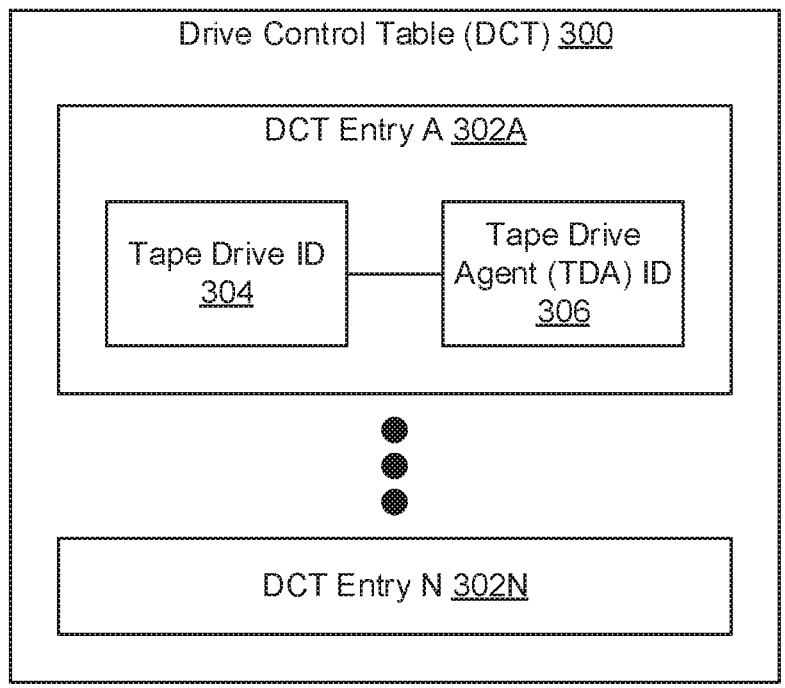
FIG. 3A shows a drive control table in accordance with one or more embodiments of the invention.

FIG. 3A shows a drive control table (DCT) in accordance with one or more embodiments of the invention. The DCT (300) may be a database that includes entries, which include mappings between an emulated tape drive and a TDA. Specifically, in one embodiment of the invention, a mapping between an emulated tape drive and a TDA may be used to identify which TDA is responsible for managing which emulated tape drive within a VTE. In view of this, the DCT (300) includes one or more DCT entries (302A-302N). In one embodiment of the invention, a DCT entry (302A-302N) may be programmed by the TDM based on the allocation or deallocation of emulated tape drives and/or corresponding TDAs. That is to say, the DCT (300) may be updated in response to the addition, deletion, and/or reconfiguration of emulated tape drives.

In one embodiment of the invention, each of the one or more DCT entries (302A-302N) includes a tape drive ID (304). A tape drive ID (304) may be a string of characters (e.g., letters, numbers, symbols, etc.) that is used to identify a tape drive emulated on a VTE. The tape drive ID (304) may be automatically generated when a tape drive is created/added, may be chosen or selected when the tape drive is created/added, and may be changed any time after the tape drive is created/added. In another embodiment of the invention, the tape drive ID (304) may be a unique identifier of the emulated tape drive, which distinguishes the emulated tape drive uniquely from other emulated tape drives. In such an embodiment, the tape drive ID (304) may be based on a unique identifier of the underlying host (i.e., the VTE or server) on which the emulated tape drive is executing. Further, in such an embodiment, the tape drive ID (304) may be rarely changed or modified for the life of the emulated tape drive. As such, the tape drive ID (304) may be of any length and may contain any combination of characters that allow an emulated tape drive to be uniquely identified. By way of an example, a tape drive ID (304) may be an alphanumeric tag given by an administrator, or may be a N-bit integer (where N>0) expressed in hexadecimal notation and generated by the TDM.

In one embodiment of the invention, each of the one or more DCT entries (302A-302N) further includes a TDA ID (306). A TDA ID (306) may be a string of characters (e.g., letters, numbers, symbols, etc.) that is used to identify a TDA executing on a VTE. The TDA ID (306) may be automatically generated when a TDA is created, may be chosen or selected when the TDA is created, and may be changed any time after the TDA is created. In another embodiment of the invention, the TDA ID (306) may be a unique identifier of the TDA, which distinguishes the TDA from other TDAs executing on a VTE. In such an embodiment, the TDA ID (306) may be based on a unique identifier of the underlying host (i.e., the VTE or server) on which the TDA is executing. Further, in such an embodiment, the TDA ID (306) may be rarely changed or modified for the life of the TDA. As such, the TDA ID (306) may be of any length and may contain any combination of characters that allow a TDA to be uniquely identified. By way of an example, a TDA ID (306) may be an alphanumeric tag given by an administrator, or may be a N-bit integer (where N>0) expressed in hexadecimal notation and generated by the TDM.

Additional and/or alternative information may be included in a DCT entry (302A-302N) without departing from the scope of the invention. For example, the one or more DCT entries (302A-302N) may further include a VTE ID, which may identify the VTE on which the emulated tape drive is executing and, accordingly, may also uniquely distinguish the VTE from other VTEs executing in the VTS.

Figure 3B:
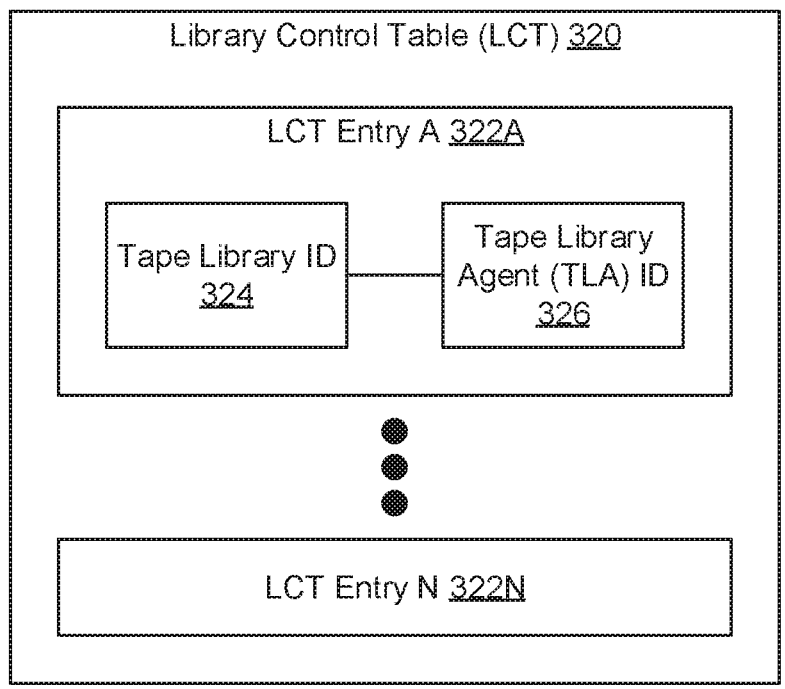
FIG. 3B shows a library control table in accordance with one or more embodiments of the invention.

FIG. 3B shows a library control table (LCT) in accordance with one or more embodiments of the invention. The LCT (320) may be a database that includes entries, which include mappings between a tape library and a TLA. Specifically, in one embodiment of the invention, a mapping between a tape library and a TLA may be used to identify which TLA is responsible for managing which tape library in a VTE. In view of this, the LCT (320) includes one or more LCT entries (322A-322N). In one embodiment of the invention, a LCT entry (322A-322N) may be programmed by the TLM based on the allocation or deallocation of tape libraries and/or corresponding TLAs. That is to say, the LCT (320) may be updated in response to the addition, deletion, and/or reconfiguration of tape libraries.

In one embodiment of the invention, each of the one or more LCT entries (322A-322N) includes a tape library ID (324). A tape library ID (324) may be a string of characters (e.g., letters, numbers, symbols, etc.) that is used to identify a tape library. The tape library ID (324) may be automatically generated when a tape library is created/added, may be chosen or selected when the tape library is created/added, and may be changed any time after the tape library is created/added. In another embodiment of the invention, the tape library ID (324) may be a unique identifier of the tape library, which distinguishes the tape library uniquely from other tape libraries executing on a VTE. In such an embodiment, the tape library ID (324) may be based on a unique identifier of the underlying host (e.g., the VTE or server) on which the tape library is executing. Further, in such an embodiment, the tape library ID (324) may be rarely changed or modified for the life of the tape library. As such, the tape library ID (324) may be of any length and may contain any combination of characters that allows a tape library to be uniquely identified. By way of an example, a tape library ID (324) may be an alphanumeric tag given by an administrator, or may be a N-bit integer (where N>0) expressed in hexadecimal notation and generated by the TLM.

In one embodiment of the invention, each of the one or more LCT entries (322A-322N) further includes a TLA ID (326). A TLA ID (326) may be a string of characters (e.g., letters, numbers, symbols, etc.) that is used to identify a TLA. The TLA ID (326) may be automatically generated when a TLA is created, may be chosen or selected when a TLA is created, and may be changed any time after the TLA is created. In another embodiment of the invention, the TLA ID (326) may be a unique identifier of the TLA, which distinguishes the TLA from other TLAs executing on a VTE. In such an embodiment, the TLA ID (326) may be based on a unique identifier of the underlying host (e.g., the VTE or server) on which the TLA is executing. Further, in such an embodiment, the TLA ID (326) may be rarely changed or modified for the life of the TLA. As such, the TLA ID (326) may be of any length and may contain any combination of characters that allows a TLA to be uniquely identified. By way of an example, a TLA ID (326) may be an alphanumeric tag given by an administrator, or may be a N-bit integer (where N>0) expressed in hexadecimal notation and generated by the TLM.

Additional and/or alternative information may be included in a LCT entry (322A-322N) without departing from the scope of the invention. For example, the one or more LCT entries (322A-322N) may further include a VTE ID, which may identify the VTE on which the tape library is executing and, accordingly, may also uniquely distinguish the VTE from other VTEs executing in the VTS.

Figure 4A:
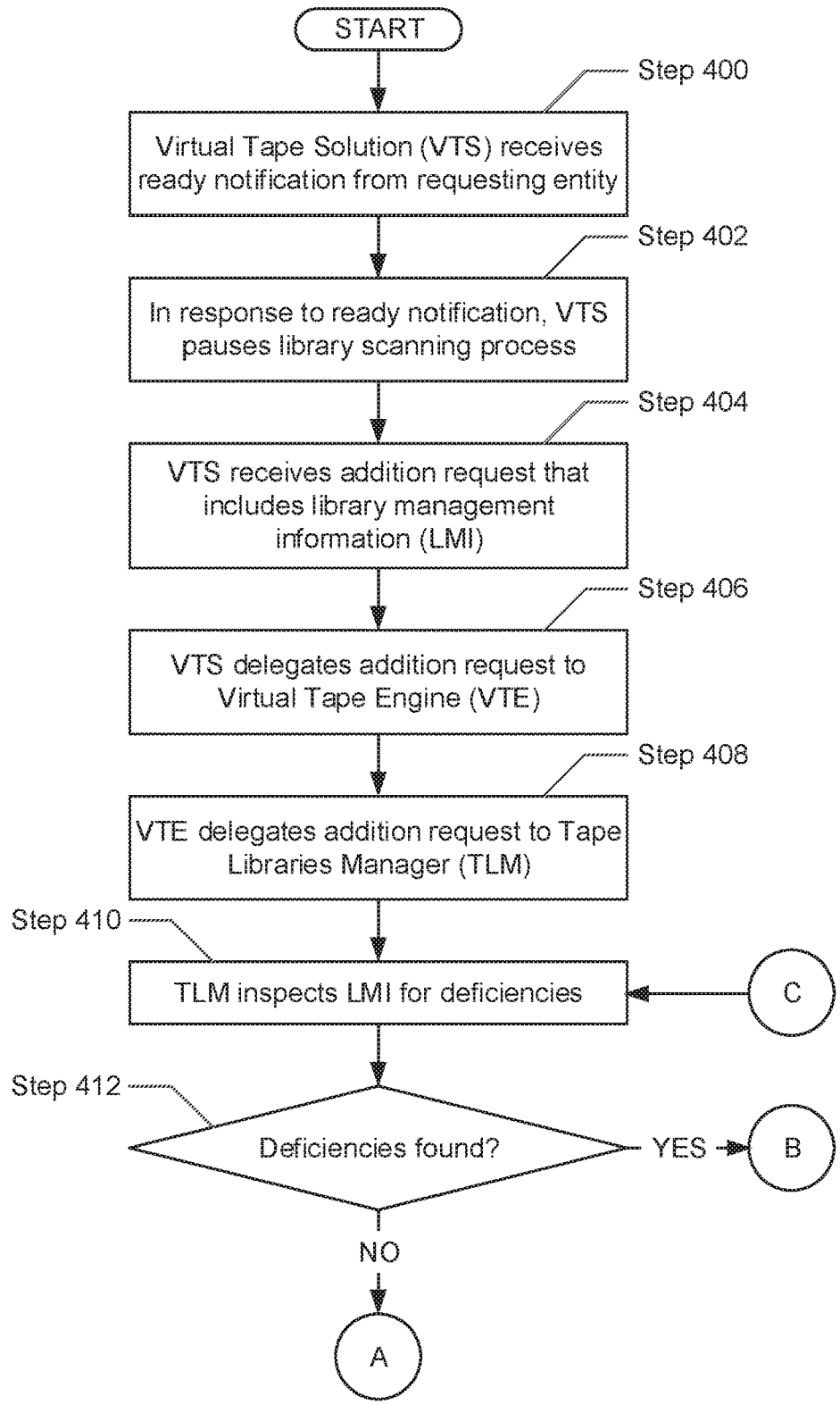
FIGS. 4A-4C show flowcharts describing a method for configuring a tape library non-disruptively in accordance with one or more embodiments of the invention.
Figure 4B:
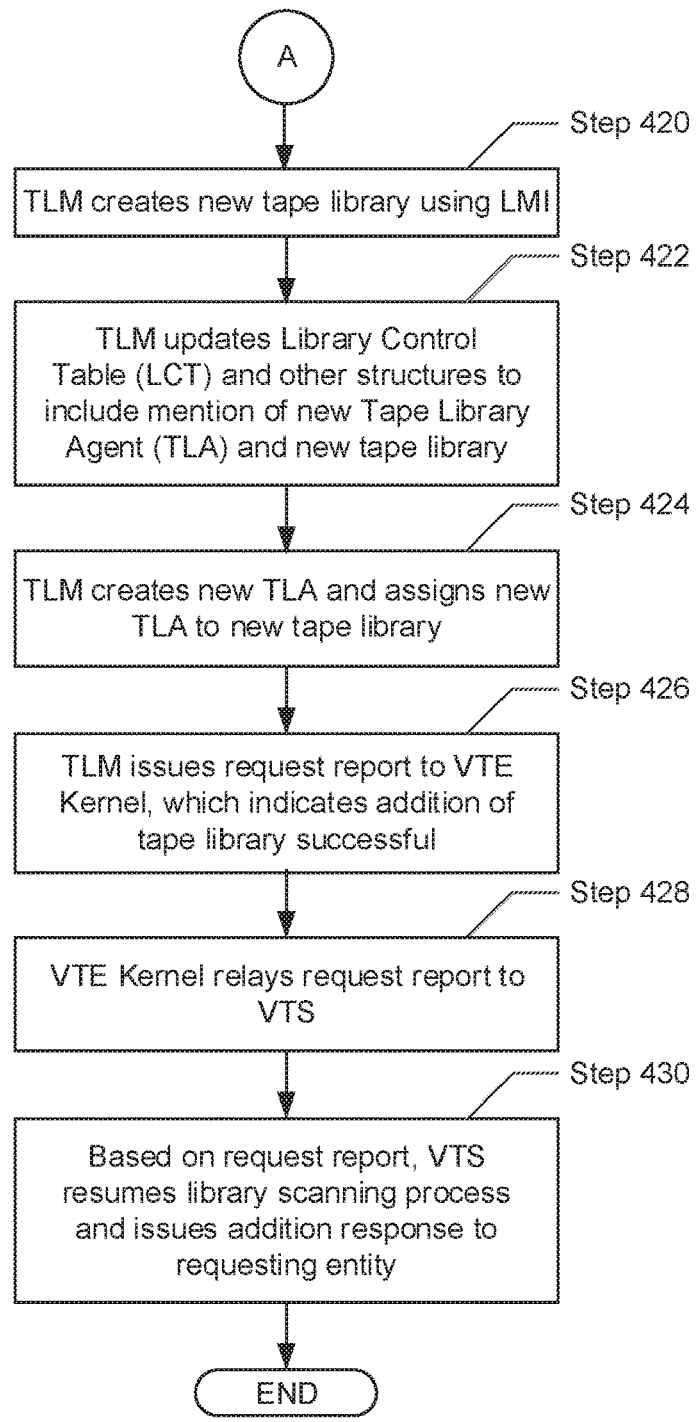
Figure 4C:
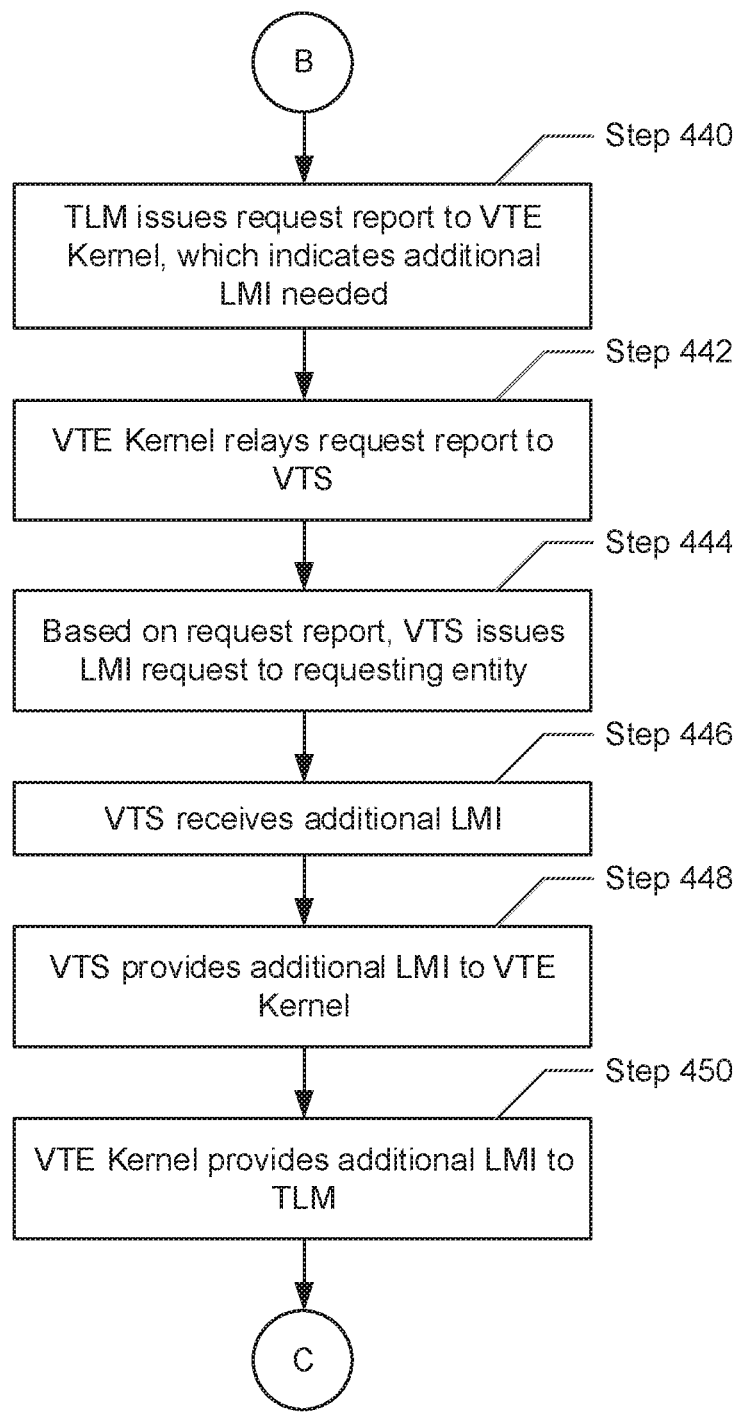

FIGS. 4A-4C show flowcharts describing a method for configuring a tape library non-disruptively in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 4A, in Step 400, the virtual tape solution (VTS), or more specifically, the VTS application program interface (API) receives a ready notification from a requesting entity. In one embodiment of the invention, the ready notification may be representative of instructions advising the VTS of the subsequent transmittal of a tape library addition (i.e., configuration) request.

In Step 402, in response to receiving the ready notification, the VTS pauses execution of one or more library scanning processes running on the one or more virtual tape engines (VTEs) therein. In one embodiment of the invention, a library scanning process may be an instance of a computer program executing on each VTE in the VTS. Further, a library scanning process may include functionality to continuously monitor the various tape libraries (i.e., file systems) defined in each VTE for changes (e.g., the introduction or mounting of new tape volume images (i.e., files or records) within the tape libraries, the removal or unmounting of existing tape volume images from the tape libraries, etc.). In one embodiment of the invention, pausing a library scanning process executing on a VTE may prevent the VTS from configuring a new mount point incorrectly for the tape library to be reconfigured.

In Step 404, after successfully pausing one or more library scanning processes (in Step 402), the VTS API receives a tape library addition request from the requesting entity. In one embodiment of the invention, the addition request may include library management information (LMI) representative of configuration information pertaining to the new tape library yet to be created. The LMI may include information pertaining to, but not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored.

In Step 406, the VTS API delegates the addition request to a VTE. In one embodiment of the invention, the VTE where which the addition request is delegated may be specified in metadata included in the received LMI. In another embodiment of the invention, the VTE where which the addition request is delegated may be selected at random by the VTS API. In yet another embodiment of the invention, the VTE where which the addition request is delegated may be selected based on metrics monitored across each of the VTEs forming the VTS. The metrics observed may include, for example, the current load executing across the VTEs, where the VTE exhibiting the least load may be chosen as the VTE where the addition request is delegated.

In Step 408, the VTE kernel executing on the selected VTE receives the delegated addition request. In one embodiment of the invention, based on the inclusion of the tape library ID, the VTE kernel may subsequently relay the addition request to the tape library manager (TLM) executing on the VTE.

In Step 410, upon receiving the addition request including the LMI, the TLM proceeds to inspect the LMI for deficiencies. In one embodiment of the invention, a LMI deficiency may entail, for example, one or more of the following conclusions: (i) the storage location of tape volume images forming the tape library may be undefined or incorrect; (ii) the mount point for the tape library in the VTE may be undefined or incorrect; (iii) the classification of the tape library, designated by the requesting entity, may be unrecognizable; (iv) metadata describing the tape library and/or its contents may be undefined or incomplete; and (v) a configuration specifying a selection of storage system features to enable or disable may be incomplete or not provided.

In Step 412, a determination is made as to whether at least one deficiency was found (during inspection of the LMI by the TLM in Step 410). If it is determined that at least one deficiency had been discovered in the LMI, the process proceeds to Step 440 (see e.g., FIG. 4C). On the other hand, if it is determined that no or zero deficiencies had been discovered during inspection of the LMI, the process proceeds to Step 420 (see e.g., FIG. 4B).

Turning to FIG. 4B, in Step 420, after determining (in Step 412) that the LMI contained zero deficiencies, the TLM creates a new tape library. In one embodiment of the invention, the new tape library may be created based on the information presented in the LMI.

In Step 422, the TLM updates the library control table (LCT) (see e.g., FIG. 3B) and/or other data structures to include mention of the new tape library (created in Step 420). In one embodiment of the invention, the TLM may further update the LCT to include mention of a new tape library agent (TLA) yet to be created, which would include functionality to manage the newly created tape library. Updating the LCT may entail at least creating a new LCT entry in the LCT. The new LCT entry may at least contain a mapping relating the new tape library to a new TLA. More specifically, the new LCT entry may contain a new tape library ID associated with the new tape library and a new TLA ID associated with the new TLA (yet to be created).

In Step 424, after updating the LCT (in Step 422), the TLM creates the new TLA introduced above. In one embodiment of the invention, creation of the new TLA may entail instantiation of a computer program instance, to be executed on the VTE, and provided at least a portion of the LMI to properly manage the new tape library. After creating the new TLA, the TLM assigns or associates the new TLA to/with the newly created (i.e., configured) tape library.

In Step 426, the TLM issues a request report to the VTE kernel. In one embodiment of the invention, the request report may indicate that the addition of the new tape library (per the request received in Step 404) was successful.

In Step 428, the VTE kernel relays the request report (received from the TLM) to the VTS, or more specifically, to the VTS API. In Step 430, based on the request report, the VTS API resumes the one or more library scanning processes executing amongst the one or more VTEs. Further, also based on the request report, the VTS API issues an addition response to the requesting entity. In one embodiment of the invention, the addition response, like the request report, may indicate that the configuration (i.e., addition) of the tape library was successful. From here, the process ends.

Turning to FIG. 4C, in Step 440, after determining (in Step 412) that at least one deficiency had been found during inspection of the LMI, the TLM issues a request report to the VTE kernel. In one embodiment of the invention, the request report may indicate that additional LMI is required to fulfill the request.

In Step 442, the VTE kernel relays the request report (received from the TLM) to the VTS, or more specifically, to the VTS API. In Step 444, based on the request report, the VTS API issues a LMI request to the requesting entity. In one embodiment of the invention, the LMI request may specify that the requesting entity provide one or more of the following information: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored.

In Step 446, the VTS API receives the requested additional LMI from the requesting entity. In Step 448, the VTS API provides the additional LMI to the VTE kernel, whereas in Step 450, the VTE kernel relays the additional LMI back to the TLM. The process subsequently proceeds to Step 410.

Figure 5:
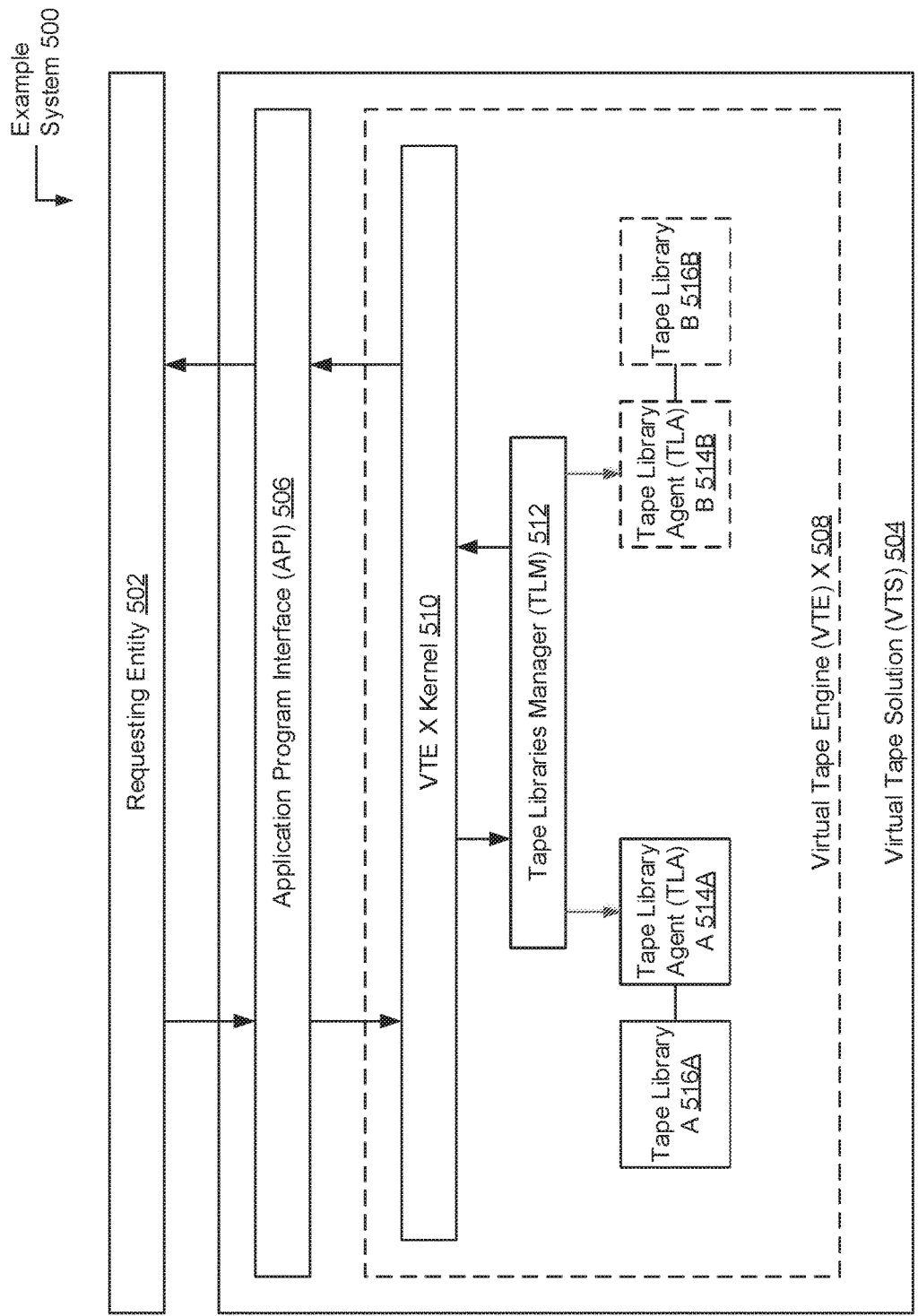
FIG. 5 shows an example system in accordance with one or more embodiments of the invention.

FIG. 5 shows an example system in accordance with one or more embodiments of the invention. The following example, presented in conjunction with components shown in FIG. 5, is for explanatory purposes only and not intended to limit the scope of the invention.

Turning to FIG. 5, the example system (500) includes a requesting entity (502) operatively connected to a VTS (504). The VTS (504) includes an API (506) tasked with receiving requests from, as well as issuing responses to, the requesting entity (502). The VTS (504) further includes a VTE X (508) on which several components are executing. These components include, but may not be limited to, a VTE X kernel (510) in direct communication with the VTS API (506) and a TLM (512). The TLM (512) subsequently manages TLA A (514A), which is responsible for tape library A (516A).

Turning to the example, consider a scenario whereby the requesting entity (502), in anticipation of wanting to configure a tape library, submits a ready notification to the VTS API (506). In response to receiving the ready notification, the VTS API (506) pauses all library scanning processes executing on each VTE. After successfully pausing all library scanning processes, the VTS API (506) subsequently receives a tape library addition request from the requesting entity (502). The addition request includes a configuration for the tape library (yet to be created) represented by way of library management information (LMI) (described above).

Upon receiving the addition request, the VTS API (506) pushes the addition request to the VTE X (508). The VTE X kernel (510) subsequently delegates the addition request to the TLM (512) executing thereon. The TLM (512) then inspects the LMI (included in the addition request) for deficiencies. After verifying that zero deficiencies were found, the TLM (512) creates a new tape library (516B) based on the LMI. Subsequently, the TLM (512) updates the LCT and other data structures to include mention of the new tape library (516B) and a new TLA (514B) yet to be created. More specifically, the TLM (512) may update the LCT by generating a new LCT entry, which would contain at least a new tape library ID—e.g., "tapelibraryB", associated with the new tape library (516B) and a new TLA ID—e.g., "tlab".

After updating one or more data structures, the TLM (512) creates the new TLA (514B) to manage the newly created tape library (516B). The TLM (512) then issues a request report to the VTE X kernel (510). The request report indicates that fulfillment of the addition request (i.e., the addition of the tape library with a new configuration) was successful. The VTE X kernel (510) relays the request report to the VTS API (506), which, based on the request report, resumes the library scanning processes amongst the VTEs. Finally, the VTS API (506) generates and forwards a successful addition response to the requesting entity (502).

Figure 6:
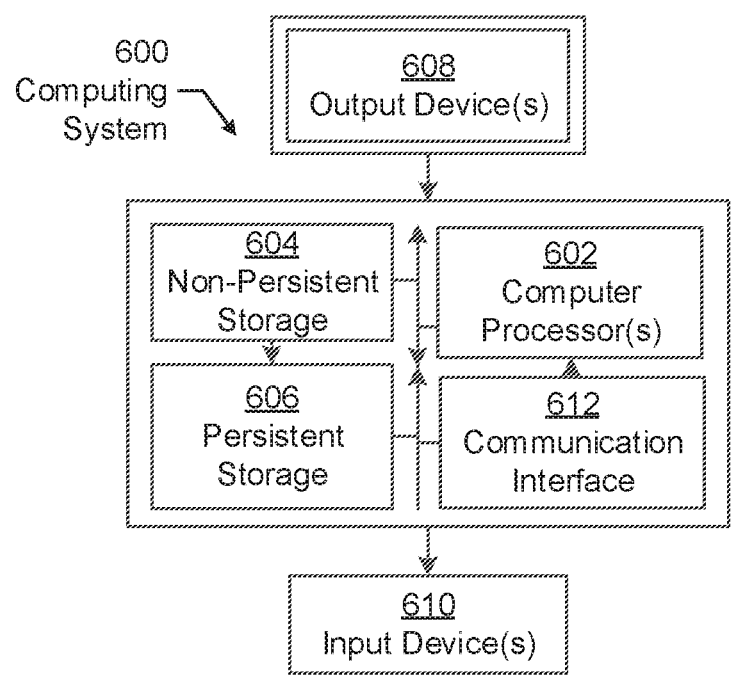
FIG. 6 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a mechanism for the non-disruptive configuration of virtual tape libraries. The configuration of a tape library non-disruptively refers to the performance of such an action without requiring the shutdown and restarting of the VTS and subsequently the other VTEs executing thereon. Prior to the invention disclosed herein, changes (i.e., addition, removal, or reconfiguration) to a tape library would require at least the shutdown of the VTE on which the to be modified tape library was executing, if not the VTS in its entirety. This was the case because configuration information detailing any wanted changes to a tape library had to be predefined in a configuration file that was only read once upon starting up (or initializing) the VTS. Further, prior to the invention disclosed herein, the aforementioned configuration information pertaining to a tape library could not be altered after initialization of the VTS. The shutdown and restarting of the VTS translated to the disruption of all work executing on the mainframe (operatively connected to the VTS) each time a tape library was to be configured/added, which proved to be impractical and inefficient.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring virtual tape libraries, comprising:
   pausing, on each virtual tape engine (VTE) of a plurality of VTEs within a virtual tape solution (VTS), a library scanning process configured to monitor for changes to a storage system, wherein the storage system comprises a plurality of tape volume images, wherein the changes to the storage system for which the library scanning process monitors comprise an addition of a plurality of new tape volume images to the storage system;
   after pausing the library scanning process, adding the plurality of new tape volume images to the storage system; and
   after adding the plurality of new tape volume images, processing a library addition request to define the plurality of new tape volume images as a new virtual tape library.

2. The method of claim 1, wherein processing the library addition request comprises:
   obtaining library management information (LMI) specified in the library addition request;
   creating, on the VTS, the new virtual tape library based on the LMI, wherein the new virtual tape library points to the plurality of new tape volume images added to the storage system;
   updating at least a library control table (LCT) to include a mapping between the new virtual tape library and a new tape library agent (TLA); and
   creating, on the VTS, the TLA to manage the new virtual tape library.

3. The method of claim 2, wherein the LMI specifies a storage location residing in the storage system, a library classification, and a configuration for features provided by the storage system.

4. The method of claim 2, further comprising:
   prior to creating the new virtual tape library:
      inspecting the LMI for at least one deficiency; and
      determining, based on the inspecting, that no deficiencies were detected.

5. The method of claim 1, further comprising:
   prior to pausing the library scanning process:
      receiving a ready notification from a requesting entity, wherein the pausing of the library scanning process is a response to the ready notification.

6. A system, comprising:
   a storage system comprising a plurality of tape volume images; and
   a virtual tape solution (VTS) operatively connected to the storage system, and comprising a plurality of virtual tape engines (VTEs),
   wherein the VTS is programmed to:
      pause, on each VTE of the plurality of VTEs, a library scanning process configured to monitor for changes to the storage system, wherein the changes to the storage system for which the library scanning process monitors comprise an addition of a plurality of new tape volume images to the storage system; and process, after an adding of the plurality of new tape volume images to the storage system following the pausing of the library scanning process, a library addition request to define the plurality of new tape volume images as a new virtual tape library.

7. The system of claim 6, further comprising a requesting entity operatively connected to the VTS, wherein the adding of the plurality of new tape volume images to the storage system and a submitting of the library addition request are performed by the requesting entity.

8. The system of claim 6, wherein the plurality of new tape volume images is defined as the new virtual tape library on one VTE of the plurality of VTEs.

9. The system of claim 8, wherein defining the plurality of new tape volume images comprises creating the new virtual tape library without restarting the plurality of VTEs.

10. The system of claim 8, further comprising a tape libraries manager (TLM) executing on the one VTE of the plurality of VTEs, wherein the TLM processes the library addition request.

11. The system of claim 8, wherein each VTE of the plurality of VTEs is a server.

12. The system of claim 6, wherein to process the library addition request, the VTS is further programmed to:
    obtain library management information (LMI) specified in the library addition request;
    create, on the VTS, the new virtual tape library based on the LMI, wherein the new virtual tape library points to the plurality of new tape volume images added to the storage system;
    update at least a library control table (LCT) to include a mapping between the new virtual tape library and a new tape library agent (TLA); and
    create, on the VTS, the TLA to manage the new virtual tape library.

13. The system of claim 12, wherein the LCT and the new TLA reside in a VTE of the plurality of VTEs.

14. The system of claim 12, wherein the LMI specifies a storage location residing in the storage system, a library classification, and a configuration for features provided by the storage system.

15. The system of claim 6, wherein the plurality of new tape volume images is a plurality of files, wherein the new virtual tape library is a file system.

16. A non-transitory computer readable medium (CRM) comprising computer readable program code, which when executed by a computer processor, enables the computer processor to:

pause, on each virtual tape engine (VTE) of a plurality of VTEs within a virtual tape solution (VTS), a library scanning process configured to monitor for changes to a storage system, wherein the storage system comprises a plurality of tape volume images, wherein the changes to the storage system for which the library scanning process monitors comprise an addition of a plurality of new tape volume images to the storage system;

after pausing the library scanning process, add the plurality of new tape volume images to the storage system; and after adding the plurality of new tape volume images, process a library addition request to define the plurality of new tape volume images as a new virtual tape library.

17. The non-transitory CRM of claim 16, further comprising additional computer readable program code, which when executed by the computer processor, enables the computer processor to:
    in order to process the library addition request:
        obtain library management information (LMI) specified in the library addition request;
        create, on the VTS, the new virtual tape library based on the LMI, wherein the new virtual tape library points to the plurality of new tape volume images added to the storage system;
        update at least a library control table (LCT) to include a mapping between the new virtual tape library and a new tape library agent (TLA); and
        create, on the VTS, the TLA to manage the new virtual tape library.

18. The non-transitory CRM of claim 17, wherein the LMI specifies a storage location residing in the storage system, a library classification, and a configuration for features provided by the storage system.

19. The non-transitory CRM of claim 17, further comprising additional computer readable program code, which when executed by the computer processor, enables the computer processor to:
    prior to creating the new virtual tape library:
        inspect the LMI for at least one deficiency; and
        determine, based on the inspecting, that no deficiencies were detected.

20. The non-transitory CRM of claim 17, further comprising additional computer readable program code, which when executed by the computer processor, enables the computer processor to:
    prior to pausing the library scanning process:
        receive a ready notification from a requesting entity, wherein the pausing of the library scanning process is a response to the ready notification.

* * * * *